United States Patent [19]
Will et al.

[11] 3,868,273
[45] Feb. 25, 1975

[54] BATTERY CASING AND SEALED PRIMARY SODIUM-HALOGEN BATTERY

[75] Inventors: Fritz G. Will, Scotia; Robert R. Dubin, Schenectady, both of N.Y.

[73] Assignee: General Electric Company, Schenectady, N.Y.

[22] Filed: Dec. 26, 1973

[21] Appl. No.: 428,419

[52] U.S. Cl.............. 136/83 R, 136/20, 136/86 A
[51] Int. Cl. ....................................... H01m 23/00
[58] Field of Search.................. 136/83 R, 86 A, 20

[56] References Cited
UNITED STATES PATENTS

| | | | |
|---|---|---|---|
| 3,579,382 | 5/1971 | Christopher | 136/20 |
| 3,607,405 | 9/1971 | Christopher | 136/20 |
| 3,660,063 | 5/1972 | Christopher | 136/20 X |
| 3,756,856 | 9/1973 | Tennenhouse | 136/83 R |
| 3,762,955 | 10/1973 | Dubin | 136/86 A X |
| 3,826,685 | 7/1974 | Dubin et al. | 136/83 R |

Primary Examiner—John H. Mack
Assistant Examiner—C. F. Lefevour
Attorney, Agent, or Firm—Paul R. Webb, II; Joseph T. Cohen; Jerome C. Squillaro

[57] ABSTRACT

A battery casing and a sealed primary sodium-halogen battery are disclosed wherein the battery casing includes a single seal of low temperature melting glass joining together the metallic anode cap, the inner casing of a solid sodium ion-conductive material, and the outer metallic casing. A sealed primary sodium-halogen battery has the above type of casing with a sodium anode in one casing and a cathode of a halogen in conductive material in the other casing.

3 Claims, 2 Drawing Figures

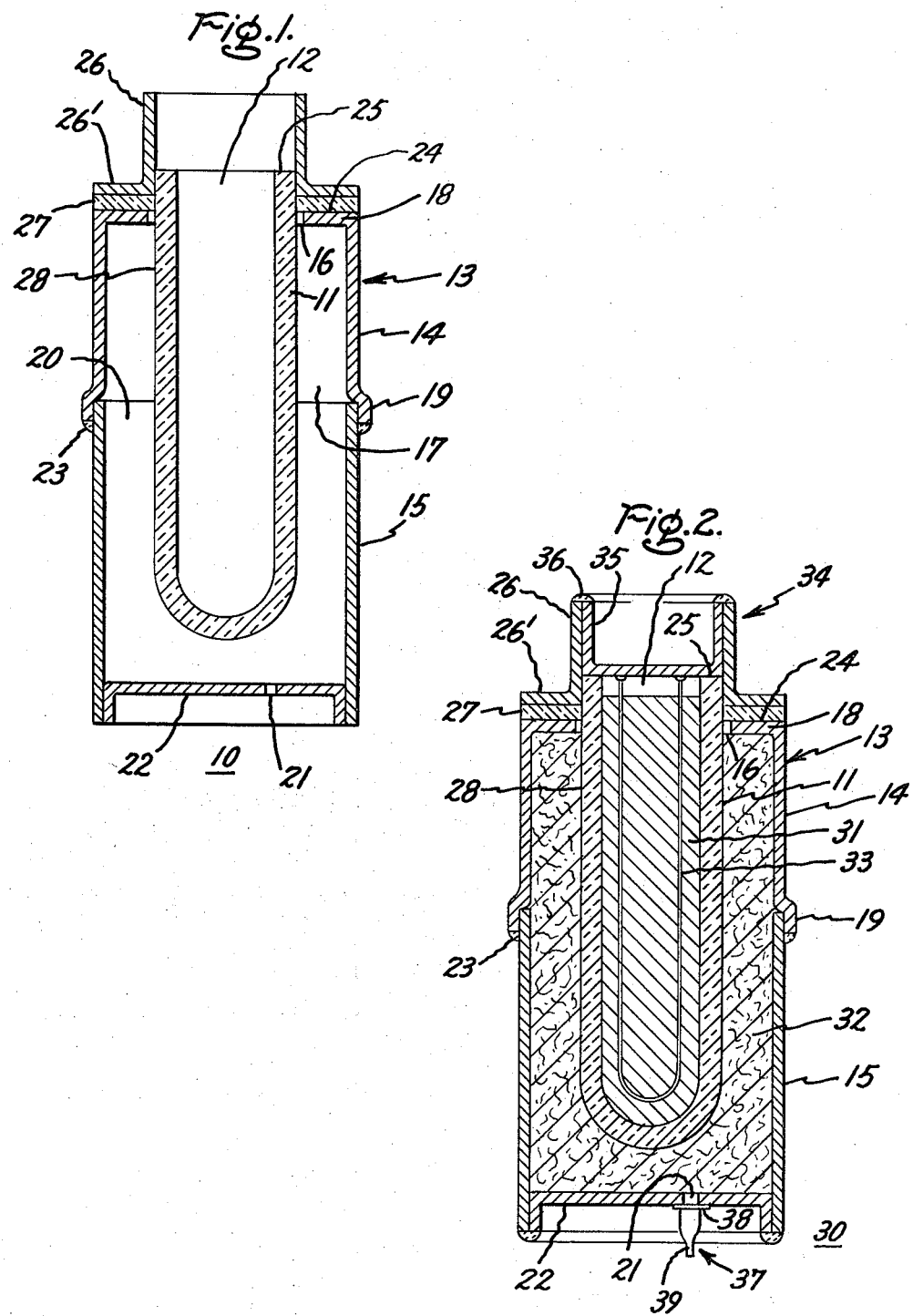

BATTERY CASING AND SEALED PRIMARY SODIUM-HALOGEN BATTERY

This invention relates to improved battery casings and to sealed primary batteries and, more particularly, to such battery casings and to sealed primary sodium-halogen batteries.

Sodium-sulfur cells, which operate at elevated temperatures, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

A sealed primary sodium-halogen battery is known in the prior art as, for example, described in Dubin U.S. Pat. No. 3,762,955 issued Oct. 2, 1973, under the title "Sealed Primary Sodium-Halogen Battery." This patent is assigned to the same assignee as the present application. This patent describes and claims such a battery with a specific outer glass envelope.

In copending patent application Ser. No. 230,864, filed Mar. 1, 1972, entitled "Battery Casing and Sealed Primary Sodium-Halogen Battery" in the names of Heinrich J. Hess and Fritz G. Will, there is described and claimed a battery casing and a sealed primary sodium-bromine battery in which a low temperature melting glass seals the flat cover, the flange of the outer casing, and the upper surface of the inner casing together.

In copending patent application Ser. No. 239,890, filed Mar. 31, 1972 now abandoned, in the names of Robert R. Dubin et al. and entitled "Wall Sealed Battery Casing and Sealed Primary Sodium-Halogen Battery," there is described and claimed a battery casing and a sealed primary sodium-halogen battery in which a sodium and halogen resistant glass seals together the adjacent flanges of the outer vessel portions and seals the outer vessel portions to the outer wall of the inner vessel. Both of the above copending patent applications are assigned to the same assignee as the present application.

Our present invention is directed to providing an improved battery casing and an improved sealed primary sodium-halogen battery over the above-identified patent and patent applications in that a single low temperature melting glass seal seals together the adjacent flanges of the upper portion of the outer metallic casing and the anode cap, and seals the flanges to the outer wall of the inner casing adjacent its open end.

The primary objects of our invention are to provide an improved battery casing and an improved low temperature primary battery which has a zero self-discharge rate, high cell voltage and high energy density.

In accordance with one aspect of our invention, a battery casing includes a single seal of low temperature melting glass which joins together the metallic anode cap, the inner casing of a sodium ion-conductive material, and the outer metallic casing adjacent the open end of the inner casing.

These and various other objects, features and advantages of the invention will be better understood from the following description taken in connection with the accompanying drawing in which:

FIG. 1 is a sectional view of a battery casing made in accordance with our invention; and FIG. 2 is a sectional view of a battery made in accordance with our invention.

In FIG. 1 of the drawing, there is shown generally at 10 a battery casing embodying our invention which has an inner casing of a solid sodium ion-conductive material 11 with one open end 12. An outer metallic casing 13 has an upper portion 14 and a lower portion 15. Upper portion 14 has opposite open ends 16 and 17. An inwardly extending flange 18 is affixed to upper portion 14 at its first open end 16 and a flare 19 at its open end 17. Lower portion 15 has an open end 20, an opening 21 and a removable closed end 22. Upper and lower portions 14 and 15 are joined together as by welding at 23 at their associated open ends 17 and 20. Outer metallic casing 13 surrounds inner casing 11 with exterior surface 24 of flange 18 on a lower plane than surface 25 at open end 12 of inner casing 11 and spaced from inner casing 11. A cap 26 with a flange 26' is positioned adjacent to and spaced from flange 18. A single low temperature melting glass seal 27 seals together flange 18 of upper portion 14 of metallic casing 13 and flange 26' of cap 26 and seals flanges 18 and 26 to outer wall 28 of inner casing 11 adjacent its open end 12.

In FIG. 2 of the drawing, there is shown a sealed primary sodium-halogen battery 30 embodying our invention which battery includes the above-described battery casing shown in FIG. 1. An anode 31 is positioned preferably in inner casing 11. Anode 31 which is shown as sodium metal, is selected from the class consisting of sodium, sodium as an amalgam, or sodium in a nonaqueous electrolyte. A cathode 32 of a halogen in conductive material is positioned preferably within outer casing 13 and in contact with outer wall 28 of inner casings 11 and with the inner wall of casing 13. An electronic conductor 33 is positioned within inner casing 11 and extends outwardly through open end 12 of inner casing 11. A metallic closure consists of cap 26 with flange 26' and a cap insert 35. Cap insert 35 is positioned within cap 26 and welded thereto at 36 to seal open end 12 of inner vessel 11. Electronic conductor 33 is shown welded to the interior surface of closure portion 35. A fill tube 37 is shown affixed to closed end 22 by means of welding flange 38 thereto. The opposite end of the fill tube is closed at 39, for example, by welding. The resulting structure is a sealed primary-halogen battery embodying our invention.

We found that we could form a battery casing by positioning an inner casing of a solid sodium ion-conductive material having an open end within an outer casing of a suitable, chemically stable material such as a metal of niobium or tantalum which comprises an upper portion and a lower portion, the upper portion with opposite open ends, an inwardly extending flange affixed to the upper portion at its first open end, the lower portion with opposite open ends, a removable closed end for its first open end, and an opening in the removable closed end, and the upper and lower portions joined together at their associated second open ends, such as by welding. The outer metallic casing surrounds the inner casing with the exterior surface of the flange on a lower plane than the surface of the open end of the inner casing and spaced from the inner casing. A cap with a flange is positioned adjacent the flange of the upper portion of the outer metallic casing. A single low temperature melting glass in the form of a washer is positioned between the adjacent flanges and in contact with the exterior wall of the inner vessel. The glass washer which melts at a low temperature is made of a suitable sodium and halogen resistant glass, such as Corning Glass No. 7056, General Electric Company Glass No. 1013, Sovirel Glass No. 747, or Kimble Glass No. N-51A. The glass washer and associated assembly is then heated to a temperature in the range of 1,175° to 1,250°C in an argon atmosphere whereby the glass seals together the flange of the upper portion of the outer metallic casing and the cap flange and seals the flanges to the outer wall of the inner vessel adjacent its open end. This structure results in a battery casing made in accordance with our invention.

We found that we could form a sealed primary sodium-halogen battery by employing the above-described battery casing. The anode may consist of sodium, a sodium amalgam or sodium in a nonaqueous electrolyte. The anode is positioned preferably within the inner casing. When the sodium is in the form of a sodium amalgam its range of compositions is from about 95 percent sodium and 5 percent mercury by weight to about 35 percent sodium and 65 percent mercury. For the fully charged state of the cell, the amalgam composition is preferably high in sodium. Cells using sodium amalgam cannot be used efficiently at temperatures below 21.5°C due to complete freezing of the amalgam.

The use of nonaqueous electrolytes permits battery operation to much lower temperatures as determined by the freezing point of the nonaqueous electrolyte. The preferred electrolyte is propylene carbonate in which a sodium halide salt is dissolved. This electrolyte permits battery operation down to −48°C.

The cathode is positioned preferably within the metallic casing through the associated fill tube and is in contact with both casings. The cathode comprises a mixture of bromine and iodine with from 5 to 60 weight percent iodine in electronically conductive material and with dissolved small amounts of additives. The electrically conductive materials for the mixture of bromine and iodine include a porous matrix of carbon felt, and a porous matrix of foam metal. The dissolved additives are sodium bromide, or sodium bromide and water. Small amounts of these materials are approximately 0.5 percent by weight. As it will be appreciated, the anode and cathode electrodes can be positioned in the opposite casings of the battery. In the preferred method of forming a sealed primary sodium-halogen battery, we form the battery casing as described above and shown generally in FIG. 1, except that the lower portion of the outer metallic casing is not joined initially at its open end to the open end of the upper portion of the same casing. An amount of mercury is placed within the inner vessel. The amount of mercury employed is the amount required in the sodium amalgam to be used as the anode. The insert of the closure with attached electronic conductor extends within the interior of the inner casing and contacts the mercury therein, and the insert fits within the cap of the closure and is welded thereto. In this manner, the insert seals the open end of the inner casing. The inner casing is then filled with sodium to provide a sodium amalgam anode. This is accomplished in accordance with the method described and claimed in U.S. Pat. No. 3,740,206 issued June 19, 1973. This patent is assigned to the same assignee as the present application.

It will, of course, be appreciated that the sodium, for example, in the form of sodium amalgam can be added directly to the interior of the inner casing before the insert is positioned and sealed to the cap. Further, other manners of filling the inner casing with a sodium type anode can be employed. A suitable method is to provide a fill opening or fill tube in the insert through which the inner casing is filled with the sodium type anode.

In the preferred method, the second open ends of the upper and lower portions of the outer metallic casing are welded together. Conductive material is then positioned around and in contact with the exterior surface of the inner casing. For example, carbon felt in the form of washers are slipped around the exterior surface of the inner casing. The removable closed end is then positioned in the first open end of the lower portion. The removable closed end is welded to the lower portion. A mixture of bromine and iodine with from 5 to 60 weight percent iodine with dissolved small amounts of additives is added through the fill hole or fill tube in the outer casing thereby providing a cathode within and in contact with the outer casing and in contact with the exterior surface of the inner casing. The fill hole or fill tube is then closed, for example, by welding. The resulting structure is a sealed primary sodium-halogen battery made in accordance with our invention.

Examples of battery casings and sealed primary sodium-halogen batteries made in accordance with our invention are set forth below:

EXAMPLE I

A battery casing was assembled as above described and as shown in FIG. 1 by positioning an inner casing of a solid sodium ion-conductive material with one end partially within the upper portion of an outer tantalum metallic casing with opposite open ends and an inwardly extending flange affixed to the upper portion at its first open end. A tantalum cap with a flange was positioned so that the cap flange was adjacent the flange of the upper portion. A single low temperature melting glass seal was provided initially by positioning a glass washer of Kimble Glass No. N-51A, which is sodium and halogen resistant, between the flanges and in contact with the exterior surface of the inner casing. The associated flanges and glass washer were aligned so that the outer surface of the flange of the outer metallic casing was on a lower plane than the surface of the open end of the inner casing and spaced from the inner casing. The assembly was then heated in an argon atmosphere at a temperature of 1,175°C whereby the glass washer provided a single glass seal sealing together the adjacent flanges and sealing the flanges to the outer wall of the inner casing adjacent to but spaced from its open end. The lower portion of the tantalum outer metallic casing had opposite open ends, a removable closed end, and an opening in the removable closed end. The upper and lower portions of the outer metallic casing were then joined together at their associated first open ends by welding. The removable closed end was positioned in the first open end of the lower portion. This structure resulted in a battery casing made in accordance with our invention.

EXAMPLE II

A sealed primary sodium-halogen battery was assembled as above described and as shown in FIG. 2. The battery casing was assembled as described above in Example I except that the lower portion of the outer casing was not welded to its upper portion. An insert of tantalum which forms part of the closure had attached thereto by welding on its interior surface an electronic conductor in the form of a 10 mil thick tantalum wire formed into a loop. 0.62 g of mercury were placed within the inner casing to subsequently provide a sodium amalgam as the anode. The insert was then fitted within the cap whereby the electronic conductor extended within the inner casing, contacted the side wall, and the mercury therein. The insert sealed the open end of the inner casing. The insert was then welded to the cap under high vacuum of $5 \times 10^{-5}$ torr. The interior casing was then filled with sodium to provide a sodium amalgam anode within the interior casing. This was accomplished generally in accordance with the method described and claimed in the above described U.S. Pat. No. 3,740,206. The second open ends of the upper and lower portions of the outer metallic casing were then welded together. Carbon felt in the form of a plurality of washers were slipped around the exterior surface of the interior casing. The removable closed end is then positioned in the first open end of the lower portion. The removable closed end was welded to the lower portion. A mixture of 89.0 weight percent bromine, 10.0 weight percent iodine, 0.5 weight percent water, and 0.5 weight percent sodium bromide was added through the fill hole in the closed end of the outer portion of the casing by means of a syringe. In this manner there was then provided a cathode within and in contact with the outer casing and in contact with the exterior surface of the interior casing. The fill hole was then closed by welding. The resulting structure was a sealed primary sodium-halogen battery made in accordance with our invention.

EXAMPLE III

At room temperature, the sealed primary sodium-halogen battery of Example II exhibited the following polarization behavior which is shown below in Table I.

TABLE I

| Current Density-<br>ma/cm² | Voltage-<br>volts |
| --- | --- |
| 0 | 3.57 |
| 0.1 | 3.02 |
| 0.5 | 2.80 |
| 1.0 | 2.50 |
| 2.0 | 1.73 |
| 2.7 | 0.82 |
| 3.0 | 0 |

While other modifications of the invention and variations thereof which may be employed within the scope of the invention have not been described, the invention is intended to include such as may be employed within the following claims:

What we claim and desire to secure by Letters Patent of the United States is:

1. A sealed primary sodium-halogen battery comprising an inner casing of a solid sodium ion-conductive material with one open end, an electronic conductor within the interior surface of the inner casing and extending outwardly through the open end of the inner casing, an outer metallic casing comprising an upper portion and a lower portion, the upper portion with opposite open ends, an inwardly extending flange affixed to the upper portion at its first open end, the lower portion with an open end and a closed end, the upper and lower portions joined together at their associated open ends, the outer metallic casing surrounding the inner casing with the exterior surface of the flange on a lower plane than the surface of the open end of the inner casing and spaced from the inner casing, a metallic closure consisting of an insert portion and of a cap portion, the insert portion sealing the open end of the inner casing, the cap portion with a flange positioned adjacent the flange of the upper portion of the outer metallic casing, a low single temperature melting glass seal sealing together the adjacent flanges of the upper portion of the outer metallic casing and of the cap portion of the insert and sealing the flanges to the outer wall of the inner casing adjacent its open end, the electronic conductor within the inner casing and extending outwardly through the open end of the inner casing affixed to the insert portion, an anode selected from the class consisting of sodium, sodium as an amalgam, and sodium in a nonaqueous electrolyte in one of the casings, and a cathode in the other casing, the cathode comprising a mixture of bromine and a mixture of bromine and iodine with from 5 to 60 weight percent iodine in electrically conductive material and with dissolved small amounts of additives.

2. A sealed primary sodium-halogen battery as in claim 1, in which the anode is in the inner casing.

3. A sealed primary sodium-halogen battery as in claim 1, in which the electronic conductor is a tantalum wire, the outer metallic casing is tantalum, the anode is sodium as an amalgam, the metallic closure is tantalum, the conductive material of the cathode is carbon felt, and the additives of the cathode are 0.5 weight percent of sodium bromide and 0.5 weight percent of water.

* * * * *